(12) United States Patent  
Nakata et al.

(10) Patent No.: US 6,307,842 B1  
(45) Date of Patent: Oct. 23, 2001

(54) INFORMATION SIGNAL TRANSMITTING APPARATUS

(75) Inventors: Junichi Nakata; Yoshihiro Wakita, both of Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/978,180

(22) Filed: Nov. 25, 1997

(30) Foreign Application Priority Data

Nov. 26, 1996 (JP) .................................................. 8-330437

(51) Int. Cl.[7] .................................................. G06F 13/00
(52) U.S. Cl. .......................... 370/254; 710/8; 340/825.25
(58) Field of Search .................................... 370/254, 255, 370/256, 476, 465, 252; 340/825.24, 825.25, 825.52; 709/220, 221, 222; 710/8, 10

(56) References Cited

U.S. PATENT DOCUMENTS

| | | | | |
|---|---|---|---|---|
| 5,131,016 | * | 7/1992 | Broughton | ............................ 375/122 |
| 5,619,646 | * | 4/1997 | Hoch et al. | ............................ 370/476 |
| 5,809,331 | * | 9/1998 | Staats et al. | ............................ 710/10 |
| 5,828,899 | * | 10/1998 | Richard et al. | ............................ 710/8 |

* cited by examiner

*Primary Examiner*—Edwin C. Holloway, III  
(74) *Attorney, Agent, or Firm*—Frommer Lawrence & Haug LLP.; William S. Frommer; Dexter T. Chang

(57) ABSTRACT

Disclosed is an information signal transmitting apparatus for transmitting and receiving a desired information signal via a network, by which apparatus the work of installing a variety of equipment is simplified. Information indicating an attribute of each equipment and an address of the equipment are transmitted and received via the network between the variety of equipment. Whether one piece of equipment is connectable or not to another is determined based on the received attribute information. The connection between the two pieces of equipment is established based on the determined result.

14 Claims, 13 Drawing Sheets

INFORMATION SIGNAL TRANSMITTING APPARATUS

BACKGROUND OF THE INVENTION

1. Field of the Invention

The present invention relates to an information signal transmitting apparatus which is adaptable for connecting a variety of video equipment, for example, in conformity with IEEE (The Institute of Electrical and Electronics Engineers, Inc.) 1394—High Performance Serial Interface Bus (referred to simply as IEEE 1394 hereinafter). The present invention simplifies the work necessary for installing a variety of equipment by transmitting and receiving information indicative of equipment attributes and equipment addresses between the equipment, and determining whether each equipment is connectable or not to a network based on the attribute information.

2. Description of the Related Art

When a variety of video equipment such as a TV tuner, a monitor device and an optical disk device are connected to construct an AV system, the system has been hitherto made up by, for example, connecting the variety of video equipment via specific lines with a display device, i.e., a final output device for the variety of video equipment, installed at the center.

In other words, where an AV system is constructed from those pieces of video equipment, video sources such as a TV tuner and an optical disk device are connected in any case so as to output video signals and audio signals to a monitor device as a final output object. Thus, a monitor device for use in that type of AV system has a plurality of video input terminals and audio input terminals to which are applied video signals and audio signals from the individual video sources.

Furthermore, for video equipment having a recording function such as an optical disk device, a video source such as a tuner is connected to the video equipment directly or via an external output terminal of a monitor device for applying video and audio signals to it. The connection between the video equipment and the video source is made by shielded wires or a coaxial cable through which the video and audio signals are transmitted while reducing possible mixing of noise etc.

On the other hand, in a video tape recorder having an integrally built-in camera wherein a video signal is processed in the form of a digital signal, video and audio signals can be input and output through an interface specified by IEEE 1394, for example.

IEEE 1394 specifies a low-cost standard serial interface with a high speed. A technical outline of IEEE 1394 is as follows.

<Signal Transmission>

According to IEEE 1394, a signal is transmitted using two sets of twisted pair wires. In signal transmission, the two sets of twisted pair wires are both employed to transmit a signal in one direction to establish the so-called half duplex communication. One wire transmits data and the other wire transmits a signal called a strobe. The reception side reproduces the clock by computing exclusive OR of the two signals.

Three types of data rate, i.e., 98.304 Mbps (S100), 196.608 Mbps (S200) and 393.216 Mbps (S400), are defined. Compatibility with the lower-order rates is employed so that the equipment having a higher rate can support the lower rate(s) as well.

<Equipment Connection>

Each equipment is able to have maximum 26 ports. By connecting equipment ports to each other, maximum 63 pieces of equipment can be interconnected. The interconnection is free to establish so long as there is no loop connection and the connecting stages do not exceed 16.

According to IEEE 1394, when a variety of equipment are connected, a bus initializing process is performed and a Tree structure is formed in which one piece of equipment is a root and other pieces of equipment are children or grandchildren of the root. Then, addresses are automatically allocated to the variety of equipment. IEEE 1394 has therefore a feature that the degree of freedom in method of connecting cables is large and the setting incidental to the cable connection is automated.

<1394 Communication>

According to IEEE 1394, a signal transmitted from one piece of equipment is relayed by another piece of equipment so that the same signal is transmitted to all pieces of equipment in the network. In other words, electrical connection is point-to-point, but a bus type network is formed from the logical point of view. It is therefore required to arbitrate bus usage rights before each equipment starts transmission.

To obtain the bus usage right, the equipment first waits for the bus becoming free, and then issues a request signal to its parent equipment. The equipment having received the request signal relays the request signal to its parent equipment, causing the request signal to finally reach the root. The root returns a permission signal upon receiving the request signal, and the equipment receiving the permission signal is allowed to start communication. When a plurality of equipment issue request signals at the same time, the request from one piece of equipment is allowed, but the requests from others are rejected.

<Real-time Operation>

In such a way, IEEE 1394 enables a plurality of equipment to share one bus in a time division multiplex manner through a struggle for the bus usage right. But when data requiring real-time operation, such as an audio signal and a video signal, is transmitted, it is necessary to guarantee the communication with certain time intervals and prevent omission of the data.

According to IEEE 1394, the so-called isochronous communication technique is used to transmit the data requiring real-time operation. The node managing the isochronous communication is selected during the bus initializing process, and the managing node allocates a necessary band to the equipment trying to transmit data with the isochronous communication. The root transmits a cycle start packet per 125 μs, and the equipment having received the allocated band transmits an isochronous packet in succession to the cycle start packet.

The above technique ensures that the equipment having received the allocated band can always have an opportunity to transmit data per 125 μs. If the total amount of bands used for the isochronous communication exceeds the bus capacity, allocation of the bands cannot be performed and the isochronous communication cannot start.

The interface of IEEE 1394 is expected in making a variety of video equipment more easily connected because it enables the variety of video equipment to share one bus in a time division multiplex manner and to make up a network in the ring or star form through interconnection between the equipment.

With the interface of IEEE 1394, however, between which ones of equipment video and audio signals are transmitted and received is managed by a host managing the operation of the entire system. Eventually, the cable connection between equipment can be simplified, but the connection relationship between equipment is required to be set in the host. Stated otherwise, although the work of connecting cables is itself simplified, there is a problem that the setting of the connection relationship between equipment is complicated and eventually the work of installing the variety of equipment is complicated.

SUMMARY OF THE INVENTION

In view of the state of art set forth above, an object of the present invention is to provide an information signal transmitting apparatus, an information signal transmitting method, and a medium storing an information signal transmitting program, by which the work of installing a variety of equipment can be simplified when the variety of equipment are connected via a network for transmitting and receiving a desired information signal between the equipment.

To solve the above object, according to the present invention, an information signal transmitting apparatus delivers, to other pieces of equipment on a network, attribute information indicating an attribute of the apparatus and an equipment address indicating an address of the apparatus on the network, while the apparatus acquires, from the other pieces of equipment, attribute information and equipment addresses of the other pieces of equipment. The apparatus determines, based on the acquired attribute information, whether the apparatus is connectable or not to the equipment from which the attribute information is acquired.

By acquiring the attribute information of the other pieces of equipment on the network, the apparatus can determine whether the apparatus is connectable or not to the other pieces of equipment. Also, based on the equipment addresses of the other pieces of equipment, the apparatus can transmit and receive a desired information signal to and from the other pieces of equipment. Further, by delivering the attribute information and the equipment address of the apparatus to the other pieces of equipment, any of the other pieces of equipment can also simply determine whether the equipment is connectable or not to the apparatus, and can transmit and receive a desired information signal to and from the apparatus based on the determined result. As a result, even when a variety of equipment are arranged on a network, the connection relationship between the equipment can be easily grasped via the network and data communication can be achieved between the equipment.

DESCRIPTION OF THE PREFERRED EMBODIMENTS

Preferred embodiments of the present invention will be described in detail hereunder with reference to the drawings.

(1) First Embodiment

Figure 1:
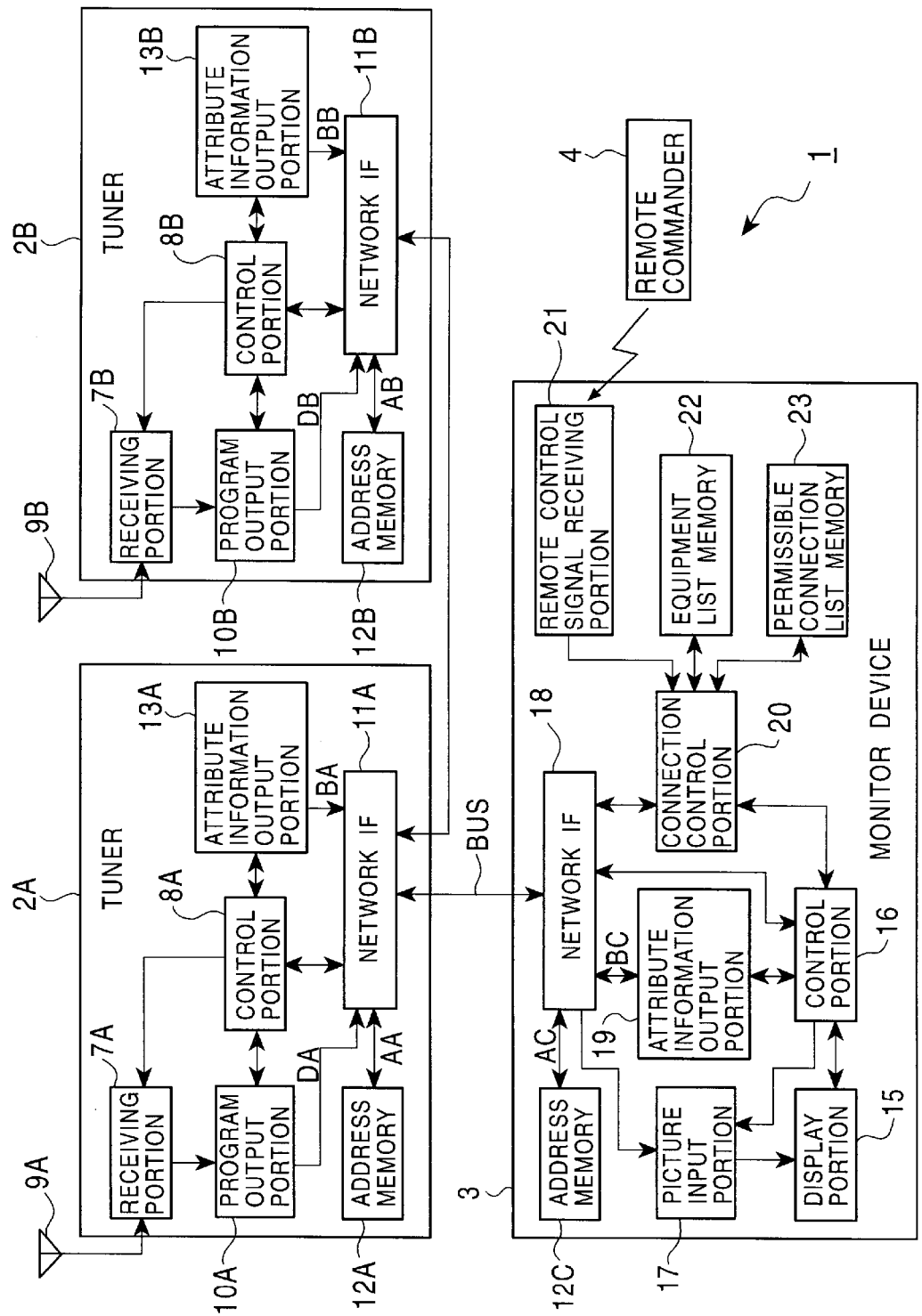
FIG. 1 is a block diagram showing an AV system according to a first embodiment of the present invention.

FIG. 1 is a block diagram showing an AV system according to a first embodiment of the present invention. In an AV system 1 of this embodiment, tuners 2A, 2B and a monitor device 3 are interconnected via a bus BUS specified by IEEE 1394 such that the tuners 2A, 2B and the monitor device 3 make up a network. Further, in the AV system 1, the operation is changed over upon a remote commander 4 being manipulated, or upon any equipment being directly manipulated, causing the monitor device 3 to monitor video and audio signals received by the tuner 2A or 2B.

Because the tuners 2A and 2B are of the same configuration, the following explanation will be made of the configuration of only the tuner 2A and the similar explanation of the tuner 2B will not be repeated below. In the tuner 2A, a receiving portion 7A changes over its operation under control of a control portion 8A to selectively receive a TV broadcasting signal selected by the user through an antenna 9A and demodulate video and audio signals from the received TV broadcasting signal.

A program output portion 10A takes in the video and audio signals demodulated by the receiving portion 7A, and encodes the video and audio signal in accordance with the predetermined format. Also, in response to a request from a network interface (network IF) 11A, the program output portion 10A outputs the encoded video and audio signals DA to the network interface 11A at the predetermined timing. Thus, the tuner 2A outputs the received video and audio signals DA via the network interface 11A to the bus BUS specified by IEEE 1394.

The network interface 11A comprises an input/output circuit capable of executing the communication process specified by IEEE 1394. Specifically, when the tuner 2A is brought into an idling state after being connected to the bus BUS, the network interface 11A executes the predetermined communication process between itself and a network interface 11B etc. of other pieces of equipment connected to the bus BUS, thereby acquiring an equipment address AA of the tuner 2A.

The equipment address AA is made up of a bus address for identifying each of buses interconnected through bridges, and a node address indicating a position on the relevant bus. The equipment address is set so that it will never overlap with any addresses of other pieces of equipment. Thus, in the network of this embodiment, buses are interconnected through bridges to transmit and receive video and audio signals between the buses, and bus addresses for identifying the buses are set to enable such communication.

The network interface 11A acquires the equipment address AA, which has not been allocated to any of other video equipment, through communication with the other video equipment, and holds the acquired equipment address AA in an address memory 12A. Based on the equipment address AA, the network interface 11A transmits and receives various information to and from the other video equipment making up the network.

Additionally, the network interface 11A monitors the status of the bus BUS. For example, if any equipment is disconnected from the bus BUS, the network interface 11A detects such a status. In accordance with the detected result, the network interface 11A executes the process of detecting the equipment address AA again.

Under the condition where the tuner 2A is held in the idling state, the network interface 11A monitors the bus BUS based on the acquired equipment address AA. When a packet designating the equipment to which the network interface 11A itself belongs is delivered onto the bus BUS, the network interface 11A takes in data of the packet and outputs it to the control portion 8A. For example, the network interface 11A takes in a control command for the tuner 2A which is output from the monitor device 3 in response to manipulation of the remote commander 4, causing the control portion 8A to turn on a power supply for the tuner 2A.

When the power supply for the tuner 2A is turned on in such a way or upon itself being directly manipulated, the network interface 11A outputs a request to occupy the bus BUS on demand from the control portion 8A. Then, when permission to occupy the bus BUS is obtained from all other pieces of equipment in response to the request, the network interface 11A outputs, to the bus BUS, both attribute information BA delivered from an attribute information output portion 13A and the equipment address AA stored in the address memory 12A.

The attribute information output portion 13A holds the attribute information BA therein and outputs the attribute information BA via the network interface 11A under control of the control portion 8A. The attribute information BA is made up of information indicating attributes of the relevant equipment. For the tuner 2A, the attribute information BA is made up of the name of the maker manufacturing the tuner 2A, a classification code indicating the type of equipment (e.g., a tuner or a monitor device), and the format of output data (e.g., MPEG 1 (ISO/IEC Standards 11172), MPEG 2 (ISO/IEC Standards 13818), MPEG 4, or digital audio interface (IEC Standards 958). When the network interface 11A is brought into an operation enable state, such a fact and the information necessary for the control are informed from the network interface 11A to a host (parent equipment) which controls the operation of the entire system 1.

Further, when a packet designating the equipment to which the network interface 11A itself belongs is delivered onto the bus BUS after the tuner 2A has been brought into the operation enable state, the network interface 11A takes in data of the packet and outputs it to the control portion 8A. For example, when the monitor device 3 instructs to start the operation of the tuner 2A in response to manipulation of the remote commander 4, the network interface 11A receives the video and audio signals DA from the program output portion 10A, followed by outputting the video and audio signals DA to the bus BUS in units of predetermined block. At this time, before outputting the video and audio signals DA in the form of a packet, the network interface 11A adds thereto the equipment address specified by the control portion 8A.

The equipment address specified by the control portion 8A in the above process is specified by the host controlling the system 1, and when the packet data is taken in by the network interface 11A and delivered to the control portion 8A, the equipment address is acquired by the control portion 8A along with the control command to start the operation of the tuner 2A.

Figure 2:
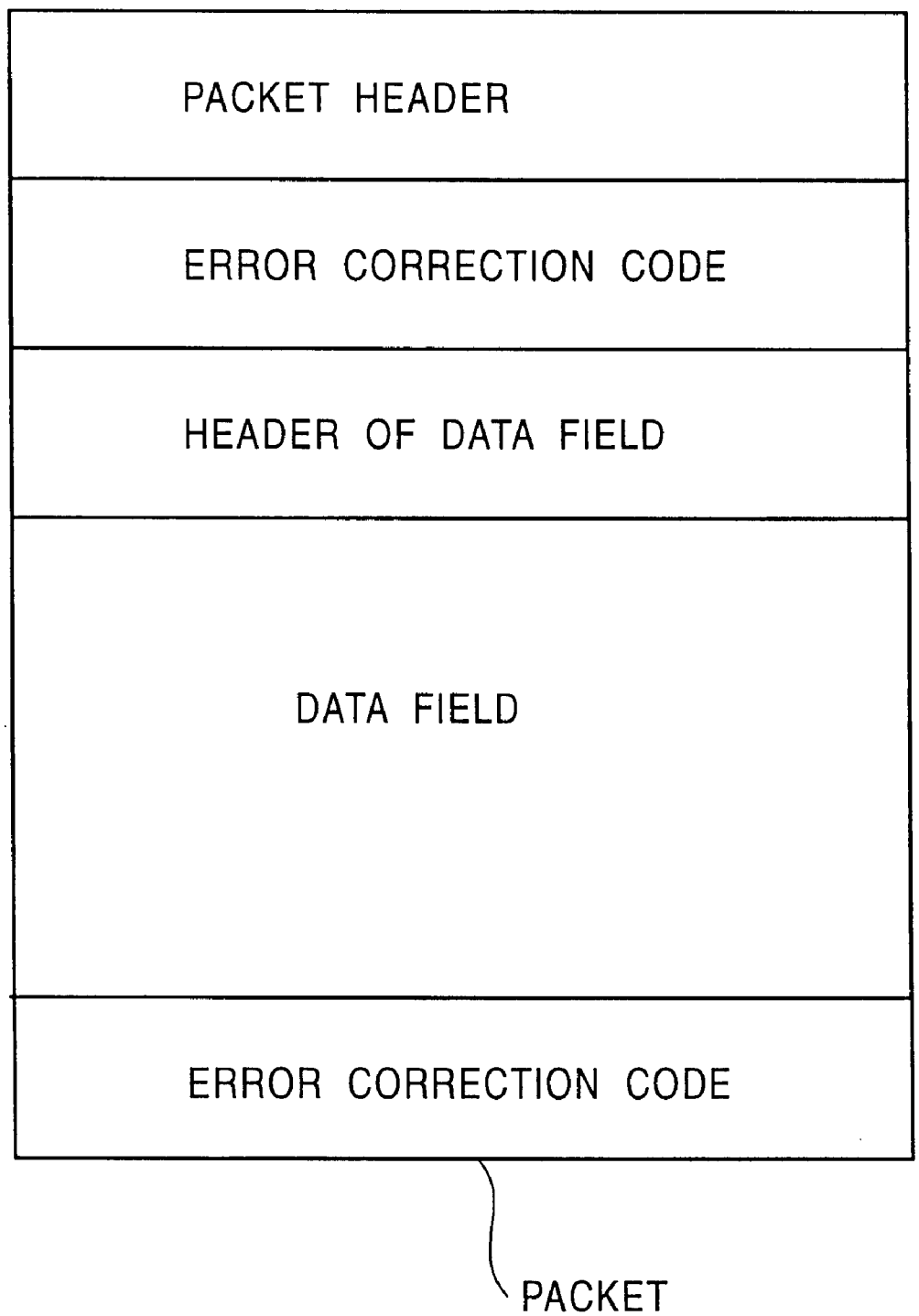
FIG. 2 is a schematic diagram showing a packet for use in the AV system of FIG. 1.

Thus, in the AV system 1, various data is transmitted and received by packet communication. As shown in FIG. 2, each packet is made up of, from the head area, header data indicating the contents of the packet, an error correction code for the header data, a header of a data field, the data field, and an error correction code for the data field in the order named. When a video signal, an audio signal, a control command, etc. are delivered to any equipment, or when any equipment acquires the equipment address, the video signal, the audio signal, the control command, etc. are allocated to the data field of a packet, and the equipment address of the destination is set in the header of the data field thereof.

The network interface 11A monitors the equipment address set in the header of the data field, takes in the packet designating the tuner 2A, and then outputs the data allocated in the data field to the control portion 8A after executing an error correction process for that data. With the data allocated in the data field, the control command, the destination equipment address, etc. are informed from the network interface 11A to the control portion 8A. As an alternative, the network interface 11A allocates video and audio signals to the data field, and sets the destination equipment address in the header of the data field.

The control portion 8A is constructed of a computer for controlling the operation of the tuner 2A. In response to manipulation of a control button (not shown) or to a control command input via the network interface 11A, the control portion 8A controls changeover of the operation of the tuner 2A to receive the desired TV broadcasting and output the received result, i.e., the video and audio signals DA to the bus BUS.

Further, when the power supply for the tuner 2A is turned on by direct manipulation, the control portion 8A controls the network interface 11A to deliver the equipment address and the attribute information of the tuner 2A to all pieces of equipment on the bus BUS. In addition, the computer constituting the control portion 8A also constitutes the attribute information output portion 13A.

As with the tuner 2A, the tuner 2B acquires an equipment address AB and outputs attribute information BB, the equipment address AB, and video and audio signals DB to the bus BUS.

The monitor device 3 constitutes a host (parent equipment) for controlling the operation of the entire AV system 1. In the monitor device 3, a display portion 15 changes over its operation under control of a control portion 16 to display a video signal applied from a picture input portion 17 and to output an audio signal also applied from the picture input portion 17. The picture input portion 17 changes over its operation under control of the control portion 16 to receive video and audio signals from the bus BUS via a network interface 18. Also, the picture input portion 17 decodes the received video and audio signals and then outputs the decoded signals to the display portion 15. Thus, the monitor device 3 enables the user to view the program received by any of the tuners 2A and 2B.

An address memory 12C holds an equipment address AC of the monitor device 3 acquired via the network interface 18. As with the network interfaces 11A, 11B of the tuners 2A, 2B, the network interface 18 acquires the equipment address AC of the monitor device 3 when the monitor device 3 is brought into an idling state after being connected to the bus BUS.

Further, under the condition where the monitor device 3 is held in the idling state, the network interface 18 monitors the bus BUS based on the acquired equipment address AC. When a packet designating the equipment to which the network interface 18 itself belongs is delivered onto the bus BUS, the network interface 18 takes in data of the packet and outputs it to the control portion 16. For example, the network interface 18 takes in a control command for the monitor device 3 which is output from another host, causing the control portion 16 to turn on a power supply for the monitor device 3.

When the power supply for the tuner 2A is turned on in such a way, or upon itself being directly manipulated or remotely operated from the remote commander 4, the network interface 18 outputs a request to occupy the bus BUS on demand from the control portion 16. Then, when permission to occupy the bus BUS is obtained in response to the request, the network interface 18 outputs, to the bus BUS, attribute information BC delivered from an attribute information output portion 19.

The attribute information output portion 19 in the monitor device 3 holds the attribute information BC indicating attributes of the monitor device 3. The attribute information BC is made up of the name of the maker manufacturing the monitor device 3, a classification code indicating the type of equipment, and the format of input data. When the network interface 18 is brought into an operation enable state, such a fact and the information necessary for the control are informed from the network interface 18 to another host which controls the operation of the entire system 1. Thus, the AV system 1 of this embodiment is constructed to be able to install a plurality of hosts in one network. In the AV system 1 however, only the monitor device 3 may have a function to serve as a host so that the attribute information output portion 19 is not required to execute any extra processing procedure at the start-up.

Further, when a packet designating the equipment to which the network interface 18 itself belongs is delivered onto the bus BUS after the monitor device 3 has been brought into the operation enable state from the idling state, the network interface 18 takes in data of the packet and outputs it to the control portion 16. With this feature, the monitor device 3 receives video and audio signals via the bus BUS and then outputs the video and audio signals to the picture input portion 17 under control of another host, for example. Thus, the monitor device 3 can monitor the video signal etc. output to the bus BUS upon manipulation of another host as well.

In addition to substantially the same operation of the network interface 11A of the tuner 2A, etc., as subsidiary (child) equipment, the network interface 18 operates such that when a packet having the destination address set to a default value is delivered onto the bus BUS, it takes in data of the packet. With this function, the monitor device 3 acquires the attribute information and equipment addresses of the subsidiary equipment which are necessary for the control of the AV system 1.

The network interface 18 outputs the data of the received packet to a connection control portion 20, and also delivers to the bus BUS predetermined data output from the connection control portion 20 responsively. Further, in response to the delivery of the data from the connection control portion 20, the network interface 18 receives packets transmitted from the subsidiary equipment, and outputs data allocated to the data fields of the packets to the connection control portion 20.

In such a way, the monitor device 3 grasps the entire connection relationship in the network based on not only the acquired attribute information and equipment addresses of the subsidiary equipment, but also its own attribute information and equipment address. Moreover, the monitor device 3 controls the operation of the entire network based on the grasped connection relationship.

Additionally, as with the network interface 11A of the subsidiary equipment, if any equipment is disconnected from the bus BUS, the network interface 18 re-detects the equipment addresses and informs them to the connection control portion 20. In other words, when connection of any equipment is changed, the monitor device 3 acquires again the attribute information and equipment addresses of subsidiary equipment which are necessary for the control of the AV system 1.

The control portion 16 is constructed of a computer for controlling the operation of the monitor device 3. In response to manipulation of a control button (not shown), or to a control command input via the network interface 18, or to manipulation of the remote commander 4 that is input via a remote control signal receiving portion 21 and the connection control portion 20, the control portion 16 controls changeover of the operation of the monitor device 3 and communicates data between itself and the connection control portion 20 as required. As a result, the monitor device 3 can monitor the video and audio signals input via the bus BUS. In addition, the computer constituting the control portion 16 also constitutes the attribute information output portion 19 and the connection control portion 20.

The remote control signal receiving portion 21 receives a remote control signal output from the remote commander 4 and delivers it to the connection control portion 20. The connection control portion 20 controls the connection of the AV system 1 in response to an output signal from the remote control signal receiving portion 21, a control command detected via the network interface 18, and direct manipulation of the monitor device 3 detected via the control portion 16.

When equipment addresses and attribute information are delivered from the variety of equipment connected to the bus BUS, the connection control portion 20 takes in successively the delivered equipment addresses and attribute information via the network interface 18. Then, the connection control portion 20 updates an equipment list and a permissible connection list in an equipment list memory 22 and a permissible connection list memory 23, respectively, based on the taken-in equipment addresses and attribute information, and controls the operation of the entire AV system 1 in accordance with the lists thus prepared.

Specifically, the equipment list memory 22 stores an equipment list in which the equipment addresses and attribute information of the equipment detected via the bus BUS are held in the list form. Even with simple work of just connecting individual pieces of equipment to the bus BUS, therefore, the monitor device 3 can grasp the relationship between the equipment connected to the bus BUS in accordance with the equipment list.

On the other hand, the permissible connection list memory 23 holds a permissible connection list which is prepared by comparing the attribute information in the equipment list with the attribute information of the monitor device 3, and listing the connectable equipment successively based on the compared results. For example, therefore, when the user manipulates the remote commander 4 to issue an instruction to indicate selectable sources, the connection control portion 20 indicates information of each of the connectable subsidiary equipment on the display portion 15 in accordance with the permissible connection list. Also, when the user manipulates the remote commander 4 by referring to the indicated information, the connection control portion 20 allocates the destination equipment address and control command to the data field in accordance with the permissible connection list and the equipment list via the network interface 18, and delivers the destination equipment address and control command to the equipment selected by the user.

Figure 3:
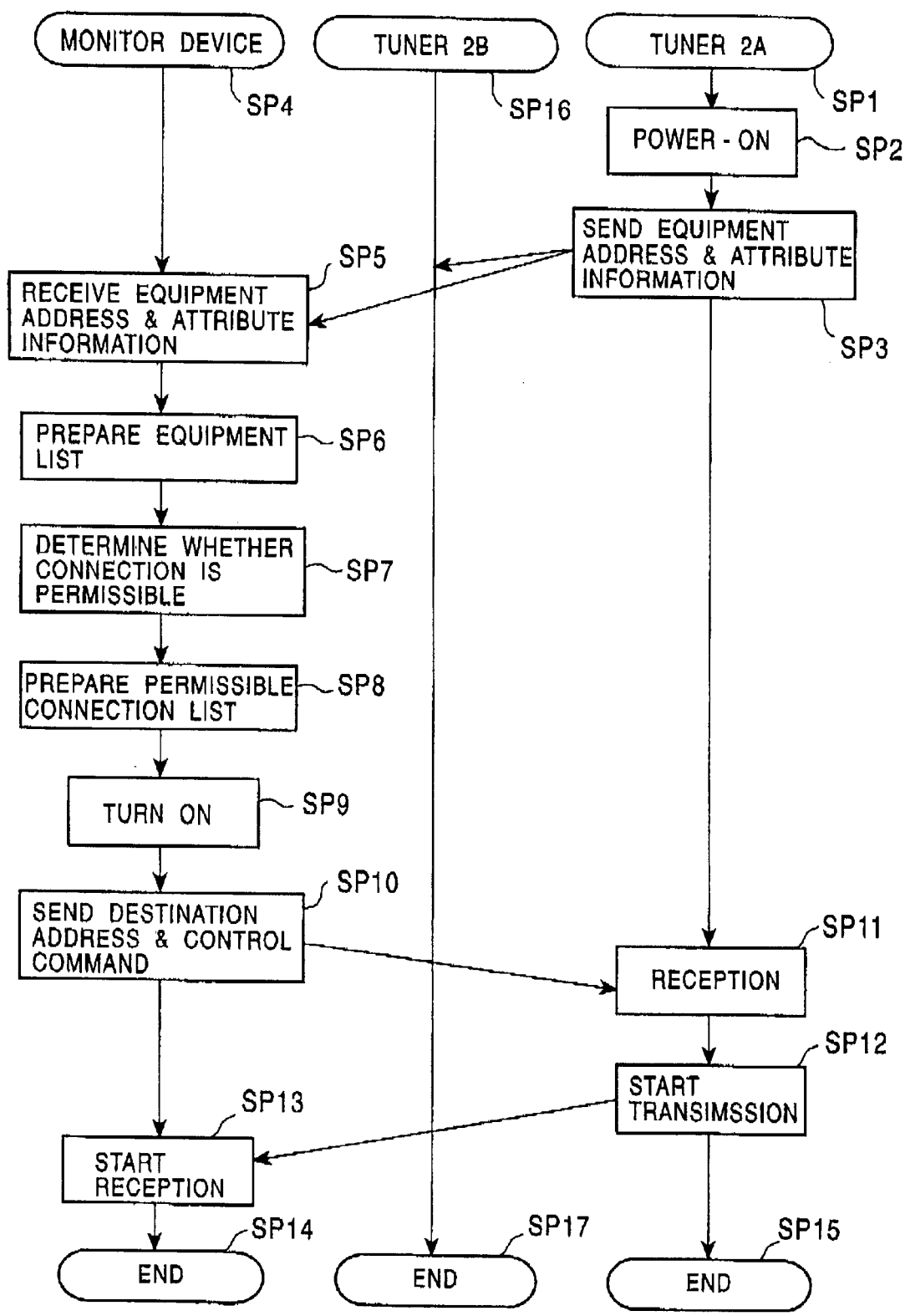
FIG. 3 is a time chart for explaining the operation of the AV system of FIG. 1.

For example, when the power supply for the tuner 2A is turned on under the condition where the equipment list and the permissible connection list are not yet prepared, the connection control portion 20 executes a processing procedure shown in FIG. 3 for causing the monitor device 3 to monitor the video and audio signals received by the tuner 2A.

More specifically, when the procedure shifts from step SP1 to SP2 in the tuner 2A and the power supply for the tuner 2A is turned on upon direct manipulation by the user, the equipment address and attribute information of the tuner 2A are delivered to the bus BUS in next step SP3 from the network interface 11A of the tuner 2A.

The delivered equipment address and attribute information are received by the network interface 18 of the monitor device 3 set as a host. To this end, the procedure shifts in the monitor device 3 from step SP4 to SP5 where the connection control portion 20 receives via the network interface 18 the equipment address and attribute information of the tuner 2A delivered to the bus BUS. In next step SP6, the connection control portion 20 prepares a updated equipment list by adding the received equipment address and attribute information of the tuner 2A to the equipment list stored in the equipment list memory 22.

The connection control portion 20 then shifts to step SP7 where, based on the format of the output data in the attribute information of the tuner 2A, it determines to which ones of equipment the tuner 2A is connectable. If it is determined from the attribute information of the monitor device 3 that the tuner 2A is connectable to the monitor device 3, the connection control portion 20 shifts to step SP8 where it updates the permissible connection list by recording the monitor device 3 as one of equipment connectable to the tuner 2A and the tuner 2A as one of equipment connectable to the monitor device 3.

Subsequently, the connection control portion 20 shifts to step SP9 where it turns on the power supply for the monitor device 3 as one of equipment connectable to the tuner 2A, because the power supply for the tuner 2A is turned on upon the user directly manipulating the tuner 2A in this case. The power supply for the monitor device 3 is turned on through data communication between the connection control portion 20 and the control portion 16. After that, the connection control portion 20 shifts to step SP10 where it issues, to the tuner 2A, a control command for instructing to set the destination address to the monitor device 3 and start transmission of the video and audio signals.

The destination address and control command are received in step SP11 by the network interface 11A of the tuner 2A monitoring the bus BUS. The received destination address and control command are input to the control portion 8A of the tuner 2A. The operation of the tuner 2A is then controlled by the control portion 8A. In next step SP12, the control portion 8A allocates the video and audio signals to the data field of a packet, designates the equipment address of the monitor device 3, and starts transmission of the video and audio signals from the tuner 2A.

The network interface 18 of the monitor device 3 monitoring the bus BUS receives the packet in which the video and audio signals are allocated. In next step SP13, the monitor device 3 starts reception of the video and audio signals sent from the tuner 2A. After that, the monitor device 3 shifts to step SP14 where it brings the processing procedure to an end. Likewise, after the transmission of the video and audio signals, the tuner 2A shifts to step SP15 where it brings the processing procedure to an end and waits for a succeeding operation. During the above processing procedure, the tuner 2B takes no part in control; namely, it shifts from step SP16 to SP17 where it waits for a succeeding operation.

Figure 4:
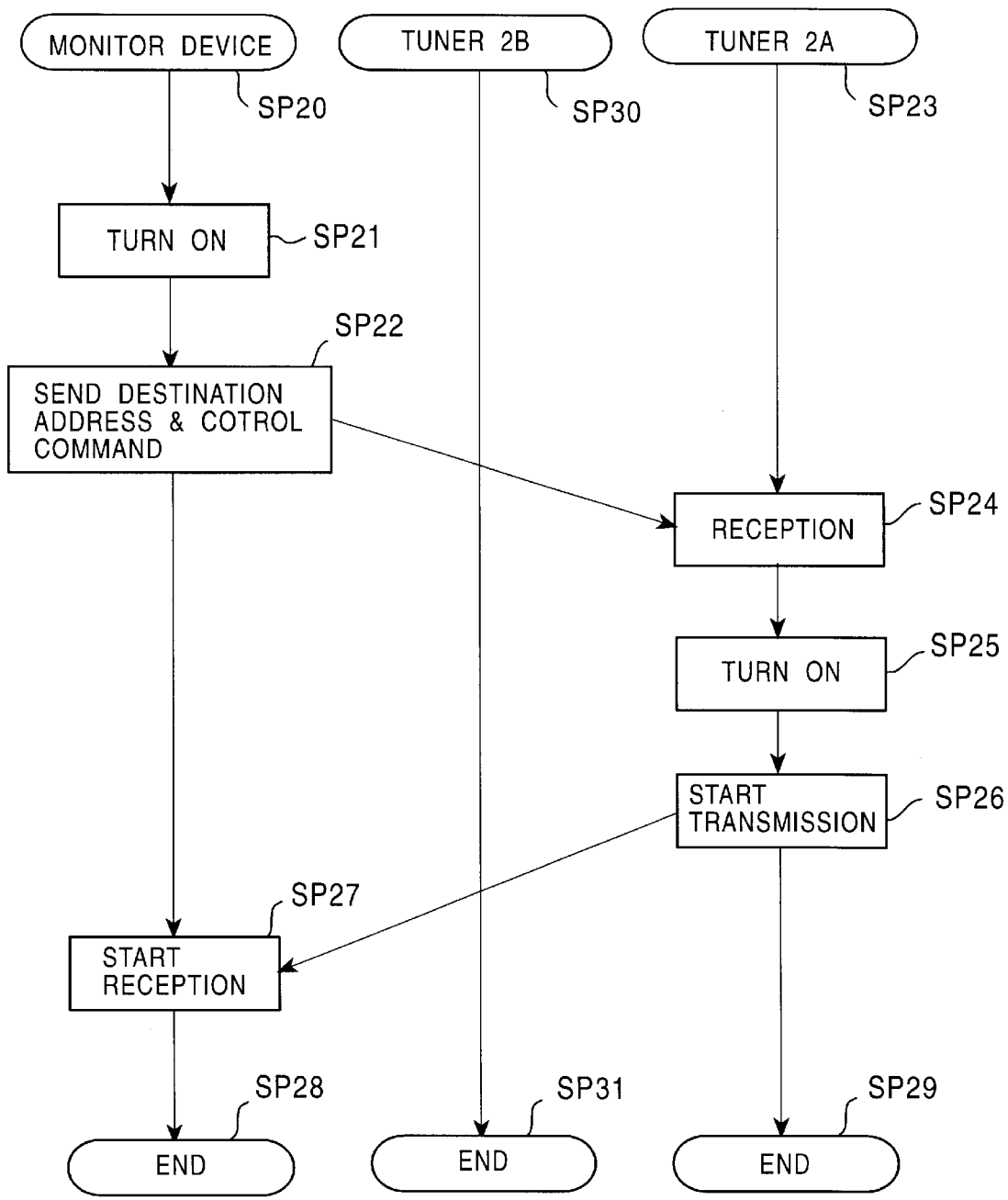
FIG. 4 is a time chart for explaining the operation in continuation with FIG. 3.

When both the power supplies for the monitor device 3 and the tuner 2A are once turned off after the end of the above processing procedure and the power supply for the monitor device 3 is then turned on, the connection control portion 20 executes a processing procedure shown in FIG. 4 for controlling the operation of the entire system.

More specifically, when the monitor device 3 is instructed to turn on the power supply upon direction manipulation thereof or manipulation of the remote commander 4, the monitor device 3 shifts from step SP20 to SP21 where the power supply is turned on by the control portion 16. The monitor device 3 then shifts to step SP22 where the connection control portion 20 selects the equipment connectable to the monitor device 3 based on the permissible connection list. In this case, since the tuner 2A is registered in the permissible connection list as the equipment connectable to the monitor device 3, the connection control portion 20 selects the tuner 2A as the equipment to be connected (i.e., the connection object), and issues, to the tuner 2A, a control command for instructing to set the destination address to the monitor device 3 and start transmission of the video and audio signals.

The tuner 2A shifts from step SP23 to SP24 where it receives the destination address and control command from the monitor device 3 via the network interface 11A. In next step SP25, the tuner 2A turns on its power supply in accordance with the received destination address and control command under control of the control portion 8A. Further, in step SP26, the tuner 2A designates the equipment address of the monitor device 3 in a packet and starts the transmission of the video and audio signals.

The network interface 18 of the monitor device 3 monitoring the bus BUS receives the packet in which the video and audio signals are allocated. In next step SP27, the monitor device 3 starts reception of the video and audio signals sent from the tuner 2A. After that, the monitor device 3 shifts to step SP28 where it brings the processing procedure to an end. Likewise, after the transmission of the video and audio signals, the tuner 2A shifts to step SP29 where it brings the processing procedure to an end and waits for a succeeding operation. During the above processing procedure, the tuner 2B takes no part in control as with the above-explained case; namely, it shifts from step SP30 to SP31 where it waits for a succeeding operation.

Incidentally, when any change in connection of the bus BUS is detected by the network interface 18 and the equipment addresses are set again, the connection control portion 20 initialize both the equipment list and the permissible connection list responsively.

With the foregoing arrangements, in the AV system 1 (FIG. 1), when a plurality of equipment such as the tuner 2A are connected to the bus BUS and supplied with idling power, the network interfaces 11A, 11B, 18 of the connected equipment inquire about equipment addresses of the equipment connected to the bus BS, whereupon the equipment addresses AA, AB, AC, which have not yet been set on the bus BUS, are set for the individual pieces of equipment.

Also, the network interfaces 11A, 11B, 18 monitor the status of the bus BUS. Then, if the connection of the bus BUS is changed, the equipment addresses AA, AB, AC are set again in a like manner.

When the power supplies for the tuner 2A etc. as subsidiary equipment are turned on under the above condition where the equipment addresses AA, AB, AC are set, the equipment addresses AA, AB and attribute information BA, BB of the subsidiary equipment are delivered to the bus BUS with the destination address set to a default value. The host (monitor device) 3 receives the delivered equipment addresses AA, AB and attribute information BA, BB. Based on the equipment addresses AA, AB and attribute information BA, BB, the host 3 then prepares a list of the equipment connected to the bus BUS.

Further, the attribute information held in the equipment list is compared with the attribute information of the host (monitor device) 3 successively, and a permissible connection list holding the relationship about the equipment connectable to each other is prepared based on the compared results. In the AV system 1, therefore, although the plurality of equipment are just connected to the bus BUS by simple connecting work, the host can grasp the connection relationship between the equipment, and can control the operations of the equipment based on the grasped connection relationship.

When the tuner 2A is selected and its power supply is turned on upon manipulation by the user, the equipment (monitor device 3) connectable to the tuner 2A is selected from the permissible connection list, and the tuner 2A is controlled to transmit the video and audio signals to the selected equipment 3. As a result, the AV system 1 is set such that the monitor device 3 can monitor the program received by the tuner 2A.

Also, when the power supply for the monitor device 3 is turned on, the equipment (tuner 2A or 2B) connectable to the monitor device 3 is selected from the permissible connection list, and the selected equipment 2A is controlled to transmit the video and audio signals to the monitor device 3. As a result, the AV system 1 is set such that the monitor device 3 can monitor the program received by the tuner 2A.

In addition, even the monitor device 3 which controls the operation of the entire system also delivers the equipment address and attribute information to the other pieces of equipment. Accordingly, where another host is arranged in the network, it can also prepare an equipment list and a permissible connection list.

Thus, in an AV system which comprises a variety of equipment, such as a tuner, a video tape recorder and a personal computer, interconnected upon a demand of the user and has a feature much different from general data communication systems, it is possible to grasp the connection relationship between the equipment on the network and to realize data communication.

With the first embodiment described above, since the monitor device 3 as a host delivers its own equipment address and attribute information, and also receives the equipment addresses and attribute information of the other pieces of equipment to hold the received data as an equipment list, it can easily grasp the connection relationship between the equipment on the network. Further, based on the equipment list, the monitor device prepares a list holding the equipment connectable to it, i.e., a permissible connection list, so that it can make control to achieve data communication between the equipment. Consequently, an AV system can be installed with simple connecting work of just interconnecting individual pieces of equipment by cables to form a network.

(2) Second Embodiment

Figure 5:
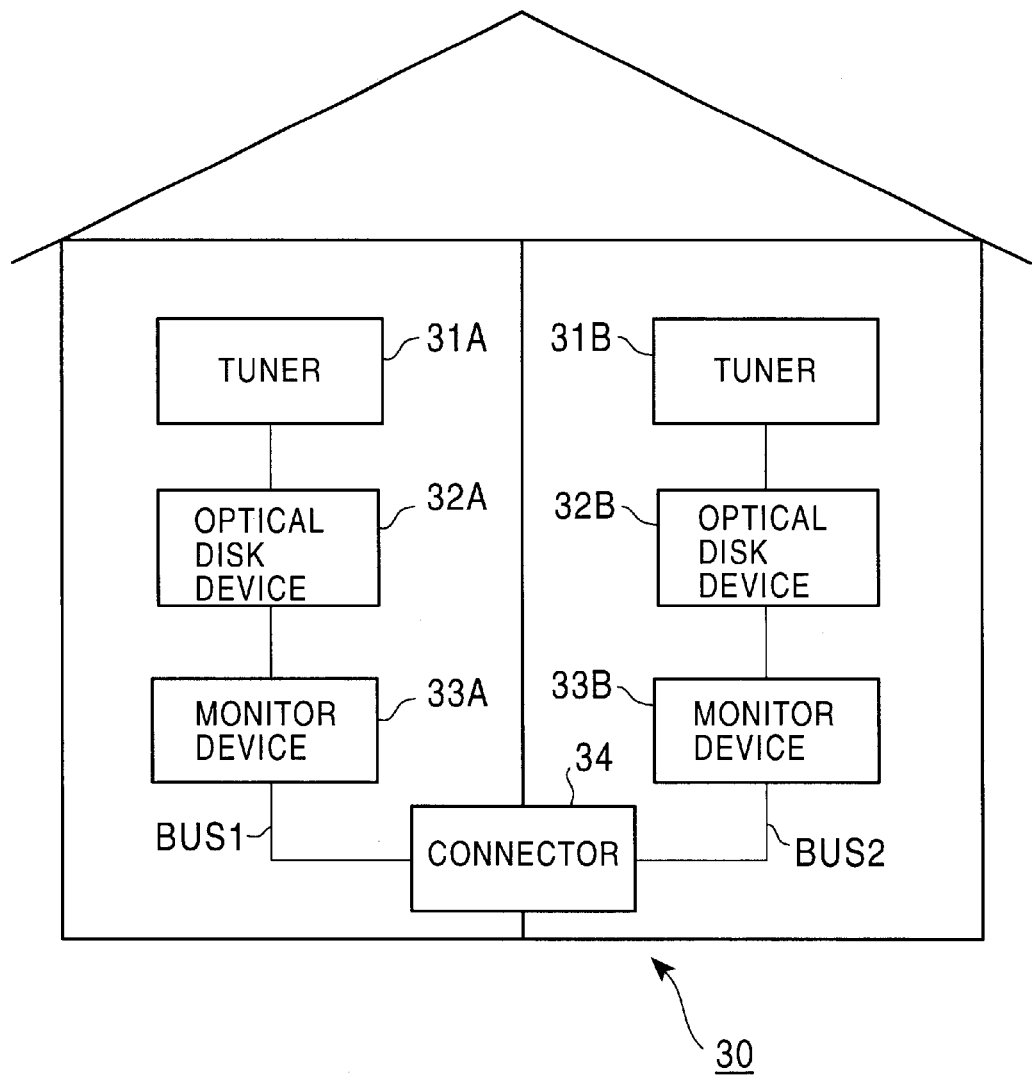
FIG. 5 is a block diagram showing an AV system according to a second embodiment of the present invention.

FIG. 5 is a block diagram showing an AV system according to a second embodiment of the present invention. In an AV system 30 of this embodiment, a tuner 31A, an optical disk 32A and a monitor device 33A forms a network in one (first) room, while a tuner 31B, an optical disk 32B and a monitor device 33B forms a network in the other (second) room.

In those networks, the optical disk 32A, the monitor device 33A, the optical disk 32B and the monitor device 33B are each constructed to serve as a host (parent equipment).

A connector 34 is constituted by a bridge for connecting buses BUS 1 and BUS 2 of the networks to each other. Thus, in the AV network 30 of this embodiment, one system comprising a tuner, an optical disk and a monitor device is associated with each of the buses BUS 1 and BUS 2 (also referred to as a bus BUS in common) via which a common packet is transmitted.

Figure 6:
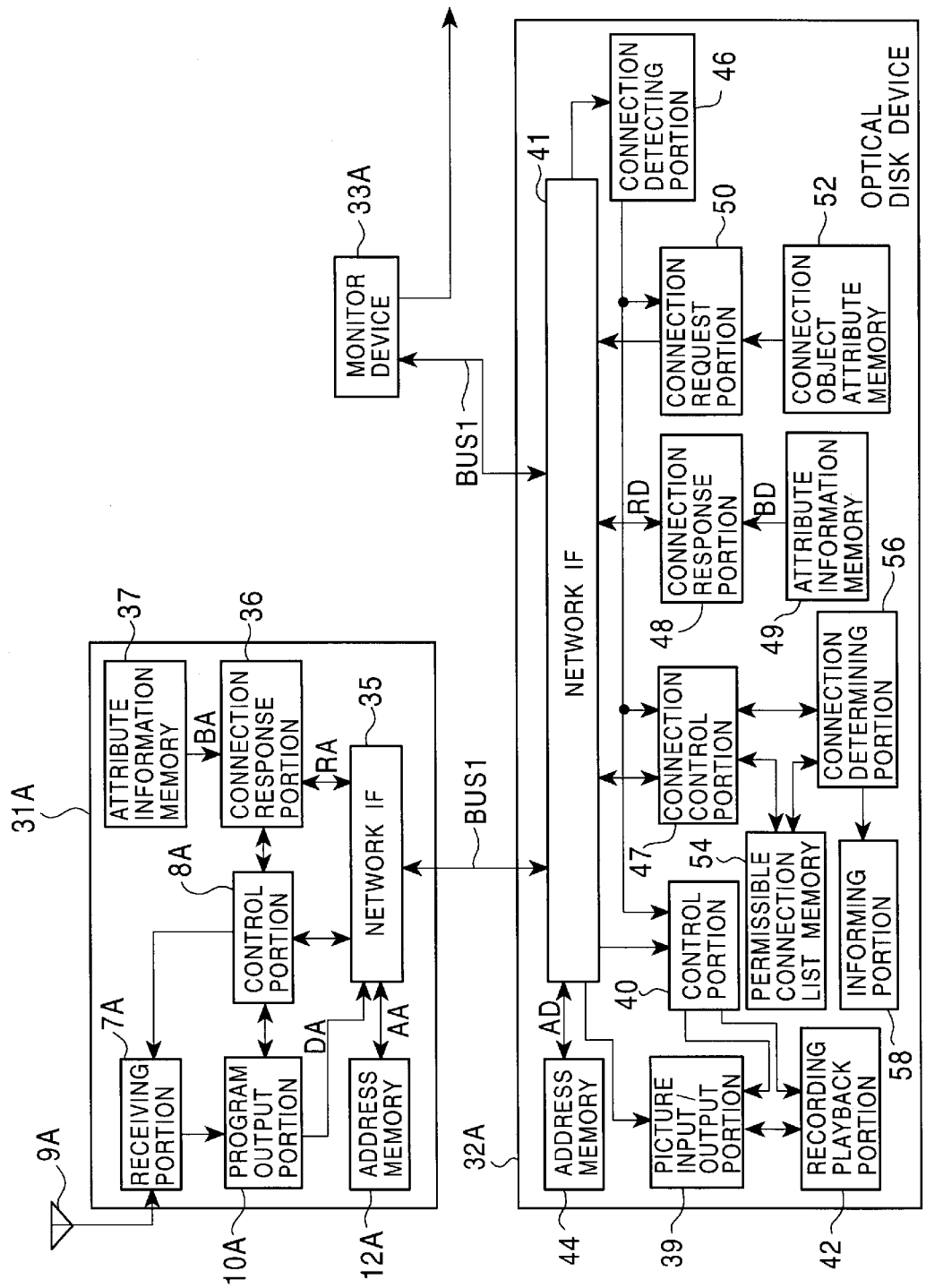
FIG. 6 is a block diagram showing the detailed configuration of a tuner and an optical disk device in the AV system of FIG. 5.

FIG. 6 is a block diagram showing the network in the first room. Because the network in the second room is of the same configuration, the following explanation will be made of only the network in the first room and the similar explanation of the network in the second room will not be repeated below. Also, the same components as those in the first embodiment described above with reference to FIG. 1 are denoted by the identical numerals and will not be explained below to avoid overlapping description.

In the network in the first room, as with the above first embodiment, a network interface 35 in the tuner 31A acquires an equipment address AA, and when its power supply is turned on, it delivers attribute information BA stored in an attribute information memory 37 and the equipment address AA stored in an address memory 12A. Also, the network interface 35 monitors the bus BUS to input and output necessary data between a control portion 8A and the bus BUS or between a connection response portion 36 and the bus BUS.

When a connection request RA is input via the network interface 35, the connection response portion 36 determines in response to the connection request RA whether the tuner 31A is connectable or not. The connection request RA is delivered to the buses BUS 1 and BUS 2 from the host while specifying the data input/output format. The connection response portion 36 reads the attribute information BA of the tuner 31A stored in the attribute information memory 37, and based on the attribute information BA, it determines that the tuner 31A is connectable when the data output format specified by the attribute information BA agrees with the data input/output format specified by the connection request RA. When the tuner 31A is determined to be connectable, the connection response portion 36 designates the destination address to the host and sends the attribute information BA and equipment address AA back to the host. Thus, in this embodiment, the tuner 31A as subsidiary (child) equipment determines in response to a request from the host whether it is connectable or not, and then outputs the determined result. Simultaneously, the tuner 31A also delivers the equipment address and attribute information necessary for the control.

In the optical disk device 32A, the picture input/output portion 39 changes over its operation under control of a control portion 40 to, in the recording mode, receive video and audio signals from the bus BUS via a network interface 41 and encode the received video and audio signals by the coding process suitable for recording onto an optical disk. The picture input/output portion 39 then outputs the coded data resulted from the coding process to a recording/playback portion 42. On the other hand, in the playback mode, the picture input/output portion 39 decodes an output signal of the recording/playback portion 42 to reproduce the video and audio signals, followed by delivering the reproduced video and audio signals via the network interface 41.

The recording/playback portion 42 also changes over its operation under control of the control portion 40 to record the coded data output from the picture input/output portion 39 on an optical disk in the recording mode, and to reproduce and output the coded data recorded on the optical disk in the playback mode. In such a way, the optical disk device 32A records on an optical disk video and audio signals input thereto from the bus BUS, and outputs to the bus BUS the video and audio signals reproduced from the optical disk.

The network interface 41 comprises an input/output circuit capable of executing the communication process specified by IEEE 1394. As with the network interface 35 of the tuner 2A, the network interface 41 acquires its equipment address AD and stores the equipment address AD in an address memory 44. Because the buses BUS 1 and BUS 2 are connected to each other by the connector 34 in this embodiment, the equipment addresses stored respectively in the address memories 44, 12A of the optical disk 32A and the tuner 31A have bus addresses different depending on whether the network is in the first or second room.

Further, the network interface 41 monitors the status of the bus BUS. For example, if any equipment is disconnected from the bus BUS, the network interface 41 detects such a status. In accordance with the detected result, the network interface 41 executes the process of detecting the equipment address AD again. The network interface 41 then informs the re-detected equipment address to a connection detecting portion 46.

The network interface 41 monitors the bus BUS based on the acquired equipment address AD. When a packet designating the equipment to which the network interface 41 itself belongs is delivered onto the bus BUS, the network interface 41 takes in data of the packet and outputs it to the control portion 40, a connection control portion 47, a connection response portion 48 and so on.

When a connection request RD is input via the network interface 41, the connection response portion 48 determines in response to the connection request RD whether the optical disk device 32A is connectable or not. The connection response portion 48 reads attribute information BD of the optical disk device 32A stored in an attribute information memory 49, and it determines that the optical disk device 32A is connectable when the data output format specified by the attribute information BD agrees with the data input/output format specified by the connection request RD. When the optical disk device 32A is determined to be connectable, the connection response portion 48 designates the destination address to another host and sends the attribute information BD and equipment address AD back to the host. Thus, in this embodiment, the optical disk device 32A as a host also determines in response to a request from another host whether it is connectable or not, outputs the determined result, and simultaneously delivers the equipment address and attribute information necessary for the control, as with the subsidiary (child) equipment.

On the other hand, when a change in bus connection is informed from the network interface 41, or when a main power supply for the optical disk device 32A is turned on, or when a control button of the optical disk device 32A is manipulated, the connection detecting portion 46 senses such an event and detects it as the case where any of the conditions to start the setting of the connection relationship is met. The connection detecting portion 46 then informs the detected result to a connection request portion 50 and the connection control portion 47.

When the setting of the connection relationship is required based on the notice from the connection detecting portion 46, the connection request portion 50 delivers the attribute information of the connectable object which is stored in a connectable object attribute memory 52. At this time, the connection request portion 50 delivers the equipment address of the optical disk device 32A as well, enabling each equipment to send back to the optical disk device 32A the result of determination as to whether the equipment is connectable or not.

The attribute information of the connectable object is specified in the data format of the counterpart equipment connectable to the optical disk device 32A, and hence corresponds to the data output format of the attribute information held in the attribute information memory 37 of each equipment. Accordingly, when the connection request portion 50 inquires about the equipment connectable to the optical disk device 32A and the tuner 31A, for example, is connectable, the connection response portion 36 of the tuner 31A sends the equipment address and attribute information back to the optical disk device 32A. Likewise, the equipment addresses and attribute information are sent back to the optical disk device 32A from the monitor devices 33A, 33B, the tuner 31B and the optical disk device 32B as well.

The connection control portion 47 accumulates the sent-back equipment addresses and attribute information in a permissible connection list memory 54, thereby preparing a permissible connection list in which all the pieces of equipment connectable to the optical disk device 32A are listed.

Further, in response to a request from the control portion 40 or a request from another subsidiary equipment, or subsequent to the above process of preparing the permissible connection list, the connection control portion 47 searches the permissible connection list and then issues a control command to start the operation and the destination equipment address, which is set to the equipment address of the optical disk device 32A as the destination, to the optimum equipment in accordance with the order of precedence in connections registered in the permissible connection list. In addition, the connection control portion 47 turns on the main power supply for the optical disk device 32A, as required, through data communication between itself and the control portion 40, thus enabling the optical disk device 32A to transmit and receive video and audio signals to and from the optimum equipment in response to manipulation of the user.

Upon a request from the connection control portion 47, a connection determining portion 56 registers the order of precedence in connections in the permissible connection list. In this embodiment, since the equipment addresses and attribute information are sent back to the optical disk device 32A from the tuners 31A, 31B, the optical disk device 32B and the monitor devices 33A, 33B, the permissible connection list is prepared based on those equipment addresses and attribute information.

Specifically, the connection determining portion 56 sets and registers the order of precedence in connections successively from one of the sent-back equipment addresses which has an address value closest to the equipment address of the optical disk device 32A. The connection determining portion 56 thus sets the order of precedence in connections such that the tuner 31A arranged in the same room as the optical disk device 32A is selected in preference to the tuner 31B. In this embodiment, therefore, with simple work of just connecting individual pieces of equipment by cables to form a network, it is possible to grasp the connection relationship between the equipment, and to set the desired connection relationship by selecting the optimum equipment as required.

Further, when determining the connectable equipment upon manipulation of the optical disk device 32A, if any equipment address and attribute information are not held in the permissible connection list, i.e., if any response is not obtained from the connectable equipment even after the elapse of a predetermined period, the connection determining portion 56 energizes an informing portion 58 to generates an alarm to the user.

Figure 7:
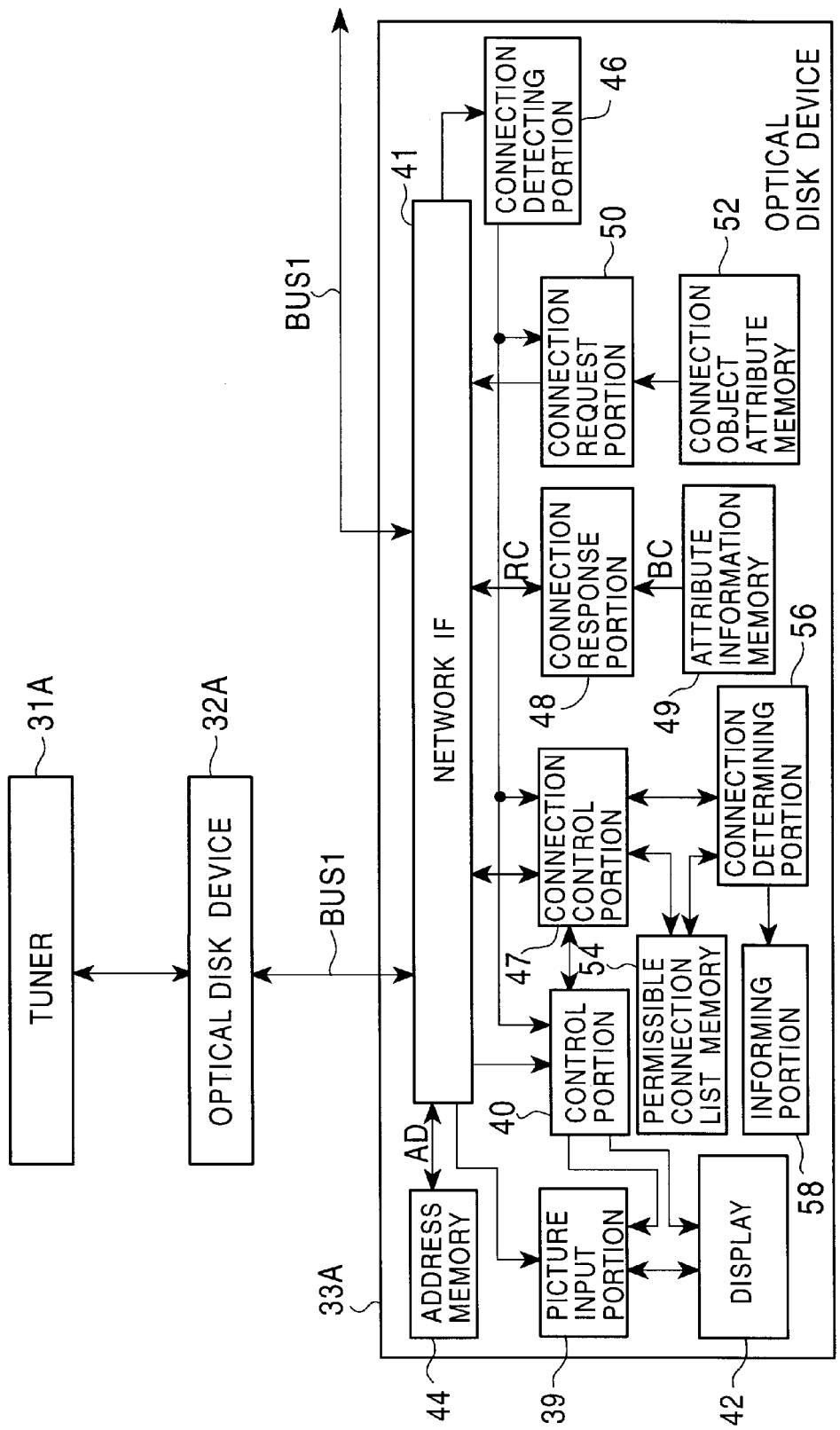
FIG. 7 is a block diagram showing the detailed configuration of a monitor device in the AV system of FIG. 5.

FIG. 7 is a block diagram showing the monitor device 33A. The same components in FIG. 7 as those in the optical disk device of FIG. 6 are denoted by the identical numerals and will not be explained below to avoid overlapping description. As with the optical disk device 32A, the monitor device 33A acquires its equipment address AC as required, and determines whether it is connectable or not in response to a connection request RC input from another host. Then, the monitor device 33A outputs the equipment address AC and attribute information when it is connectable.

When the setting of the connection relationship is required based on the notice from a connection detecting portion 46, the monitor device 33A delivers the attribute information of the connectable object which is stored in a connectable object attribute memory 52, receives from each equipment the result of determination as to whether the equipment is connectable or not, and then prepares a permissible connection list based on the received results of determination. Further, the connection determining portion 56 sets the order of precedence in connections held in the permissible connection list.

With the above arrangements, when the user selects the tuner 31A, for example, by turning on its power supply, the monitor device 33A starts up the tuner 31A disposed in the same room in accordance with the order of precedence in connections, and thereafter begins to receive video and audio signals from the tuner 31A.

In the AV system 30 (FIGS. 5, 6 and 7), particularly in the configuration shown in FIG. 6, when a plurality of equipment such as the tuner 31A are connected to the buses BUS 1, BUS 2 and supplied with idling power, the network interfaces 35, 41 of the connected equipment inquire about equipment addresses of the equipment connected to the buses BUS 1, BUS 2, whereupon the equipment addresses AA, AD, AC, which have not yet been set on the buses BUS 1 and BUS 2, are set for the individual pieces of equipment.

Also, the network interfaces 35, 41 monitor the status of the buses BUS 1 and BUS 2. Then, if the connection of the buses BUS 1 and BUS 2 is changed, the equipment addresses AA, AD, AC are set again in a like manner.

The change in connection of the buses BUS 1 and BUS 2 is detected by the connection detecting portions 46 of the hosts 32A, 33A, . . . as with the case where the power supplies for the hosts 32A, 33A, . . . , and the case where control buttons of the hosts 32A, 33A, . . . are manipulated. In either case, the detected result is informed to the connection request portion 50 and the connection control portion 47, thereby starting the process of setting the connection relationship.

Figure 8:
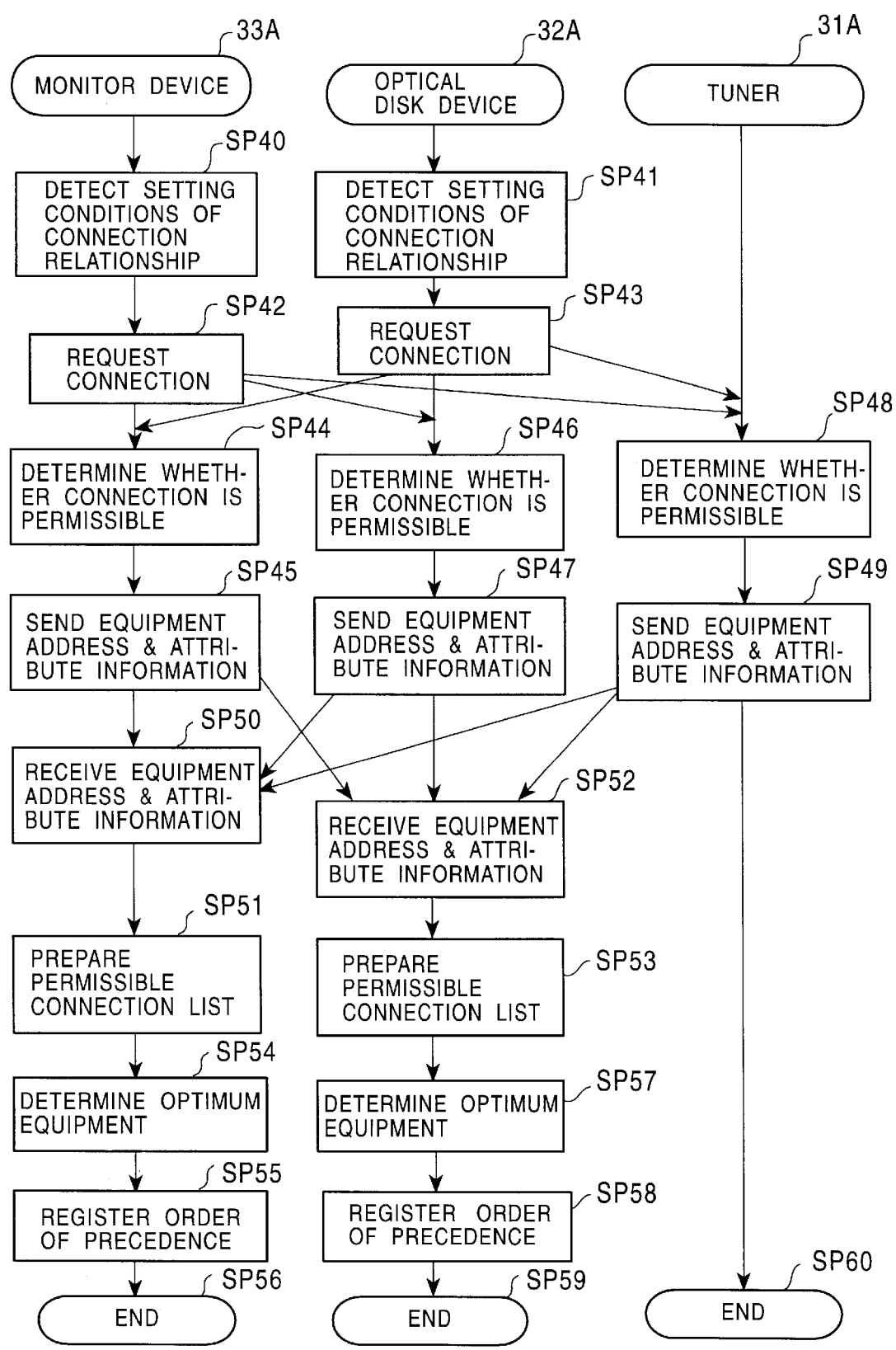
FIG. 8 is a time chart for explaining the operation of the AV system of FIG. 5.

For example, when a change in bus connection is detected, the connection change is detected by each of the hosts in the first and second rooms. In the monitor device 33A and the optical disk device 32A of those hosts, as shown in FIG. 8, the connection change is detected by the connection detecting portions 46 in steps SP40 and SP41, respectively.

Upon such detection, the monitor device 33A shifts to step SP42 where it delivers, from the connection request portion 50, the attribute information of the connectable object which is stored in the connectable object attribute memory 52, thereby issuing an inquiry to each of other pieces of equipment as to whether the equipment is connectable or not. Likewise, the optical disk device 32A shifts to step SP43 where it issues, from the connection request portion 50, an inquiry to each of other pieces of equipment as to whether the equipment is connectable or Responding to the inquiry from the optical disk device 32A, in next step SP44, the connection response portion 48 of the monitor device 33A compares its own attribute information with the inquired attribute information to determine whether the monitor device 33A is connectable or not to the optical disk device 32A. When the monitor device 33A is determined to be connectable to the optical disk device 32A, it delivers its own attribute information and equipment address in next step SP45 from the connection response portion 48 thereof to the optical disk device 32A.

In parallel, the optical disk device 32A as another host having the similar configuration shifts to step SP46 where, responding to the inquiry from the monitor device 33A, the connection response portion 48 of the optical disk device 32A compares its own attribute information with the inquired attribute information to determine whether the optical disk device 32A is connectable or not to the monitor device 33A. When the optical disk device 32A is determined to be connectable to the monitor device 33A, it delivers its own attribute information and equipment address in next step SP47 from the connection response portion 48 thereof to the monitor device 33A.

On the other hand, the tuner 31A as subsidiary equipment shifts to step SP48 where, responding to the inquiries from the monitor device 33A and the optical disk device 32A, the connection response portion 36 of the tuner 31A compares its own attribute information with the inquired attribute information to determine whether the tuner 31A is connectable or not to the monitor device 33A and whether the tuner 31A is connectable or not to the optical disk device 32A. When the tuner 31A is determined to be connectable to the monitor device 33A and the optical disk device 32A, it delivers its own attribute information and equipment address in next step SP49 from the connection response portion 36 thereof to the monitor device 33A and the optical disk device 32A.

Through the above steps, the monitor device 33A can acquire the attribute information and equipment addresses from the connectable equipment, and after receiving the attribute information and equipment addresses from the connectable equipment in next step SP50, it prepares a permissible connection list from the received attribute information and equipment addresses in step SP51. Likewise, the optical disk device 32A can acquire the attribute information and equipment addresses from the connectable equipment, and after receiving the attribute information and equipment addresses from the connectable equipment in next step SP52, it prepares a permissible connection list from the received attribute information and equipment addresses in step SP53.

In the monitor device 33A, the permissible connection list is prepared by setting the order of precedence in connections based on the types of equipment contained in the received attribute information such that the tuner 31A is connected in precedence to the optical disk device 32A. This enables the monitor device 33A to set the order of precedence in connections depending on the frequency of use the equipment and hence to make the AV system more convenient for the user.

Thus, in this embodiment, the monitor device 33A prepares the permissible connection list by acquiring the attribute information and equipment addresses from the tuner 31A and the optical disk device 32A arranged in the first room, as well as the tuner 31B and the optical disk device 32B arranged in the second room. Also, the optical disk device 32A prepares the permissible connection list by acquiring the attribute information and equipment addresses from the tuner 31A and the monitor device 33A arranged in the first room, as well as the tuner 31B, the optical disk device 32B and the monitor device 33B arranged in the second room.

After preparing the permissible connection list in such a way, in the monitor device 33A, the connection determining portion 56 accesses the permissible connection list and compares the equipment addresses of the similar type equipment with each other in next step SP54. From the compared results, in next step SP55, the connection determining portion 56 sets and registers the order of precedence in connections successively from one of the equipment addresses which has an address value closest to the equipment address of the monitor device 33A. After that, the processing procedure for the monitor device 33A is ended in step SP56. The monitor device 33A thus sets and registers the order of precedence in connections such that the tuner 31A and the optical disk device 32A arranged in the same room are connected in precedence to the tuner 31B and the optical disk device 32B arranged in the different room.

Likewise, in the optical disk device 32A, the connection determining portion 56 accesses the permissible connection list and compares the equipment addresses of the similar type equipment with each other in step SP57. From the compared results, in next step SP58, the connection determining portion 56 sets and registers the order of precedence in connections successively from one of the equipment addresses which has an address value closest to the equipment address of the optical disk device 32A. After that, the processing procedure for the optical disk device 32A is ended in step SP59. The optical disk device 32A thus sets and registers the order of precedence in connections such that the tuner 31A and the optical disk device 32A arranged in the same room are connected in precedence to the tuner 31B and the optical disk device 32B arranged in the different room.

When the main supply for any of the hosts 32A, 33A, . . . is turned on, or when the control button for any of the hosts 32A, 33A, . . . is manipulated, a sequence of the above processing steps are executed in the host turned on or manipulated. As a result, the relevant host prepares the permissible connection list and then sets and registers the order of precedence in connections.

Subsequently, the monitor device 33A etc. transmit and receive video and audio signals to and from the proper equipment in accordance with the order of precedence in connections.

Figure 9:
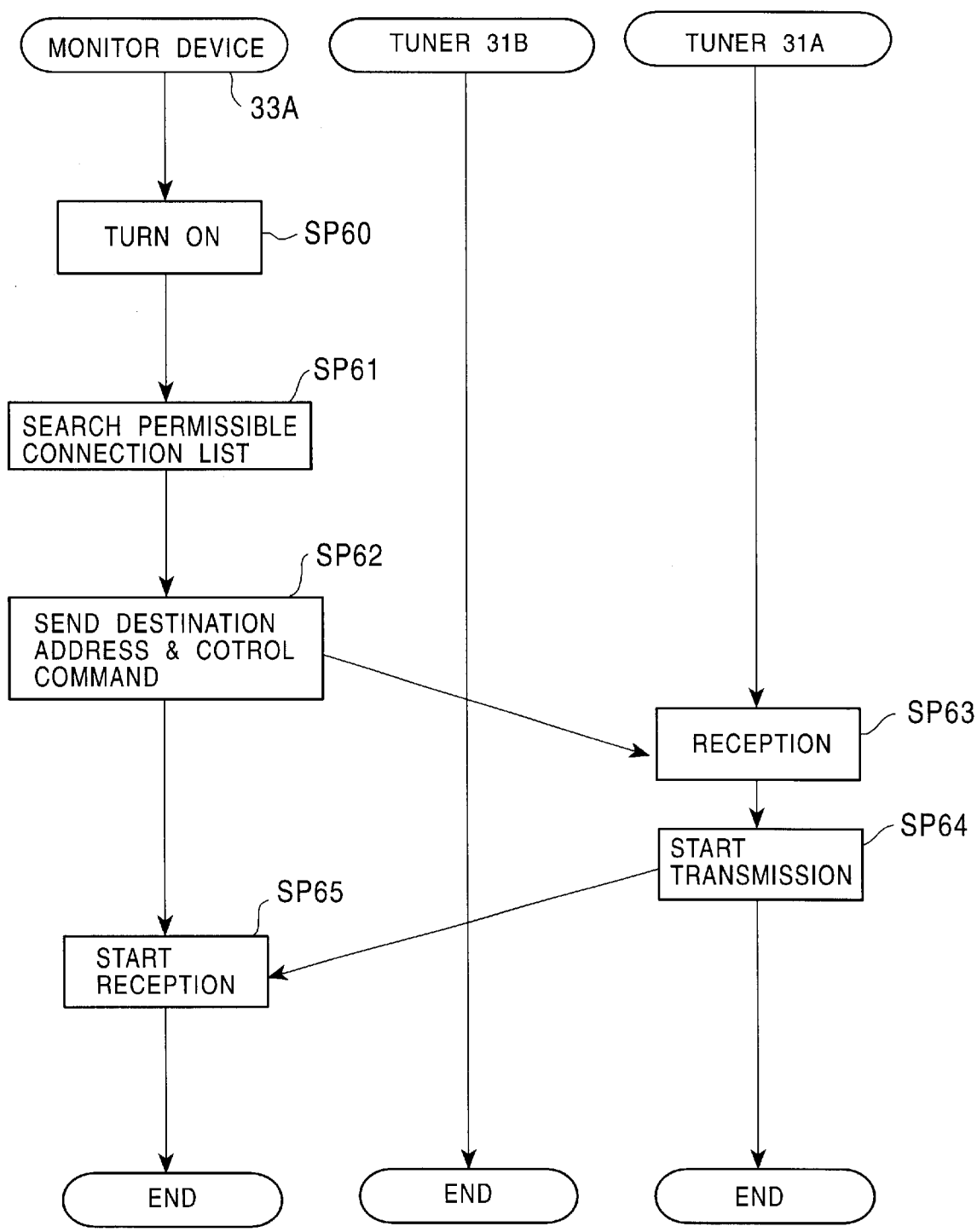
FIG. 9 is a time chart for explaining the operation in continuation with FIG. 8.

The processing for that purpose is executed as shown in FIG. 9. In the case of the main supply for the monitor device 33A being turned on, for example, after preparing the permissible connection list, or in parallel to the process of preparing the permissible connection list, the control portion 40 turns on the power for starting up the entire operation of the monitor device 33A in step SP60 and searches the permissible connection list in next step SP61.

In accordance with the order of precedence in connections registered in the permissible connection list, the monitor device 33A then issues to the tuner 31A, in step SP62, a control command for instructing to set the destination address to the monitor device 33A and start transmission of video and audio signals. Responsively, after receiving the control command in step SP63, the tuner 31A sets the destination address to the equipment address of the monitor device 33A and starts the transmission of the video and audio signals in next step SP64.

In step SP65, the monitor device 3 starts reception of the video and audio signals and monitors the video and audio signals received by the tuner 31A arranged in the same room in precedence to the tuner 31B arranged in the different room.

As explained above, in this second embodiment, each equipment determines in response to an inquiry from a host as to whether the equipment is connectable or not to the host, and then delivers its own attribute information and equipment addresses, while the host prepares a permissible connection list based on the attribute information and equipment addresses delivered from the individual pieces of equipment. With such an arrangement, the second embodiment can also provide the similar advantage as obtainable with the first embodiment.

Further, in the second embodiment, the equipment addresses of the permissible connection list are compared with each other successively to set the order of precedence in connections, and communication between the equipment is established successively in accordance with the order of precedence in connections to transmit and receive a video signal etc. therebetween. Consequently, with simple work of just connecting individual pieces of equipment by cables to form a network, it is possible to connect the equipment required by the user with priority, and to make the AV system more convenient for the user.

(3) Third Embodiment

Figure 10:
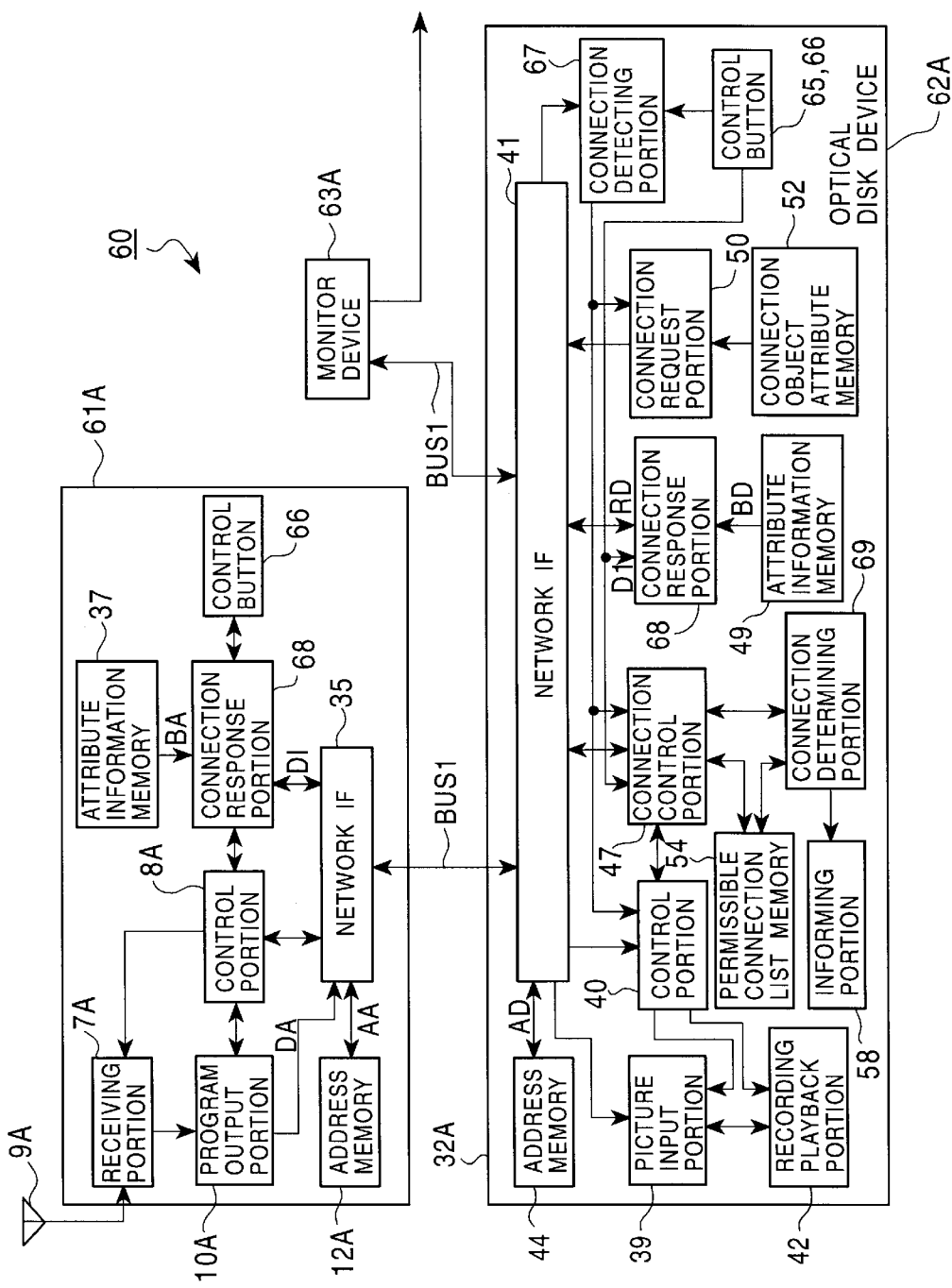
FIG. 10 is a block diagram showing the detailed configuration of a tuner and an optical disk device in an AV system according to a third embodiment of the present invention.
Figure 11:
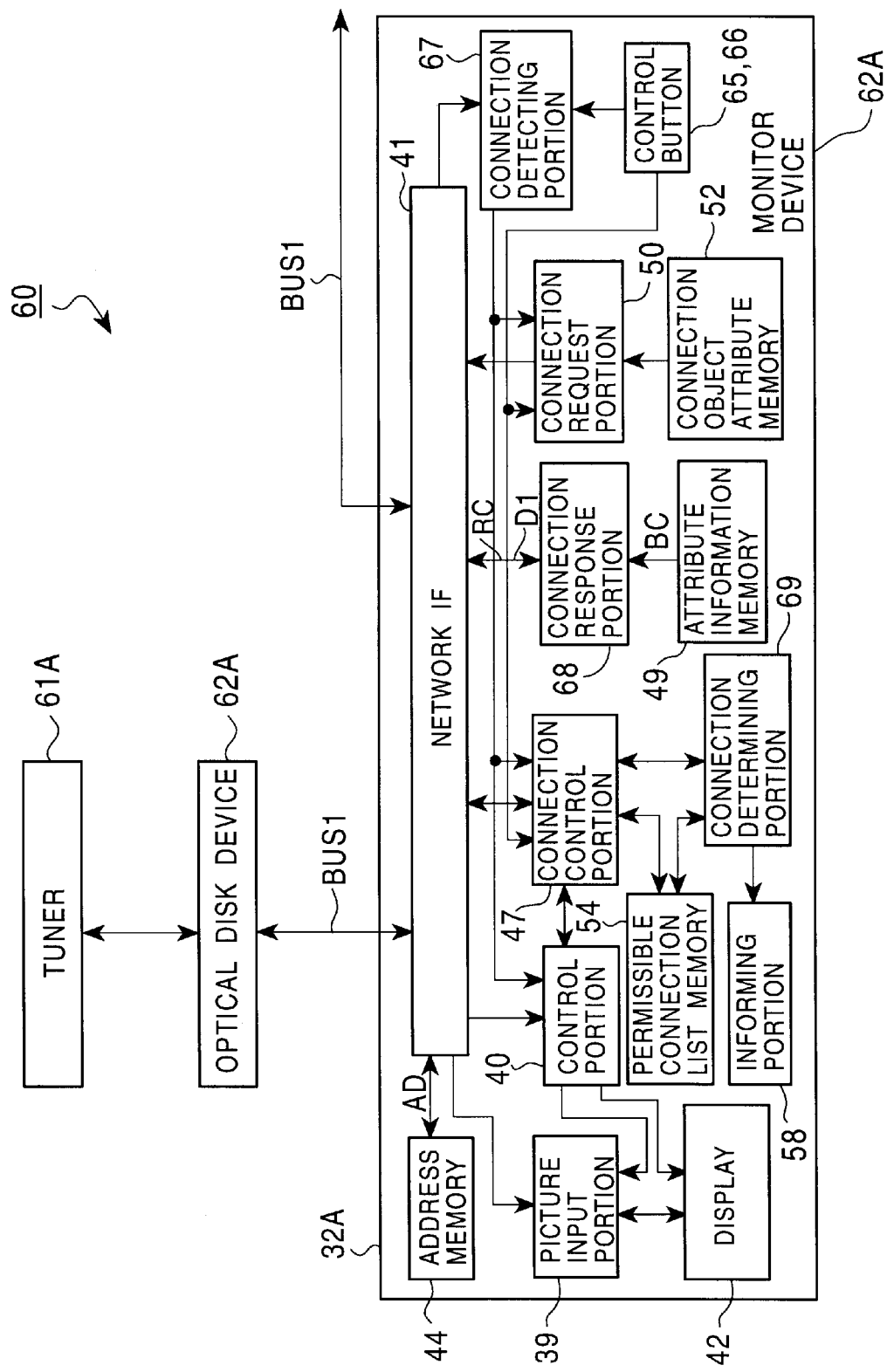
FIG. 11 is a block diagram showing the detailed configuration of a monitor device in the AV system of FIG. 10.

FIGS. 10 and 11 are block diagrams showing an AV system according to a third embodiment of the present invention, the diagrams corresponding respectively to FIGS. 6 and 7 for comparison. In an AV system 60 of this embodiment, the order of precedence in connections is set upon manipulation of a control button.

More specifically, an optical disk device 62A and a monitor device 63A each include a control button 65 used for the connection setting. A connection detecting portion 67 in each of the devices 62A, 63A issues a notice prompting to prepare a permissible connection list also in the case of the control button 65 being depressed, in addition to the cases where the conditions to start the setting of the connection relationship are met as stated above in connection with the second embodiment.

Furthermore, a tuner 61A as subsidiary equipment and the hosts 62A, 63A each include a control button 66 for instructing the priority connection. When the control button 66 is kept depressed, a connection response portion 68 in each of those components outputs the attribute information and equipment address of its own equipment after adding thereto identification data D1 corresponding to the depression of the control button 66, in response to an inquiry as to whether the equipment is connectable or not.

In the optical disk device 62A and the monitor device 63A, when a connection determining portion 69 of each device sets the order of precedence in connections in the permissible connection list prepared upon the above inquiry, the equipment added with the identification data D1 corresponding to the depression of the control button 66 is given top priority in the order of precedence in connections with respect to the other pieces of equipment of similar type.

With the system configuration shown in FIGS. 10 and 11, therefore, the equipment to be connected to the host with priority can be registered optionally by simple manipulation of just simultaneously depressing the control button 65 for instructing the connection setting and the control button 66 for instructing the connection in precedence to the other pieces of equipment. As a result, the order of precedence in connections registered as explained above in connection with the second embodiment can be set again or modified, as required, into the desired order at the user's discretion; hence the AV system can be made even more convenient for the user than the AV system of the second embodiment.

(4) Fourth Embodiment

Figure 12:
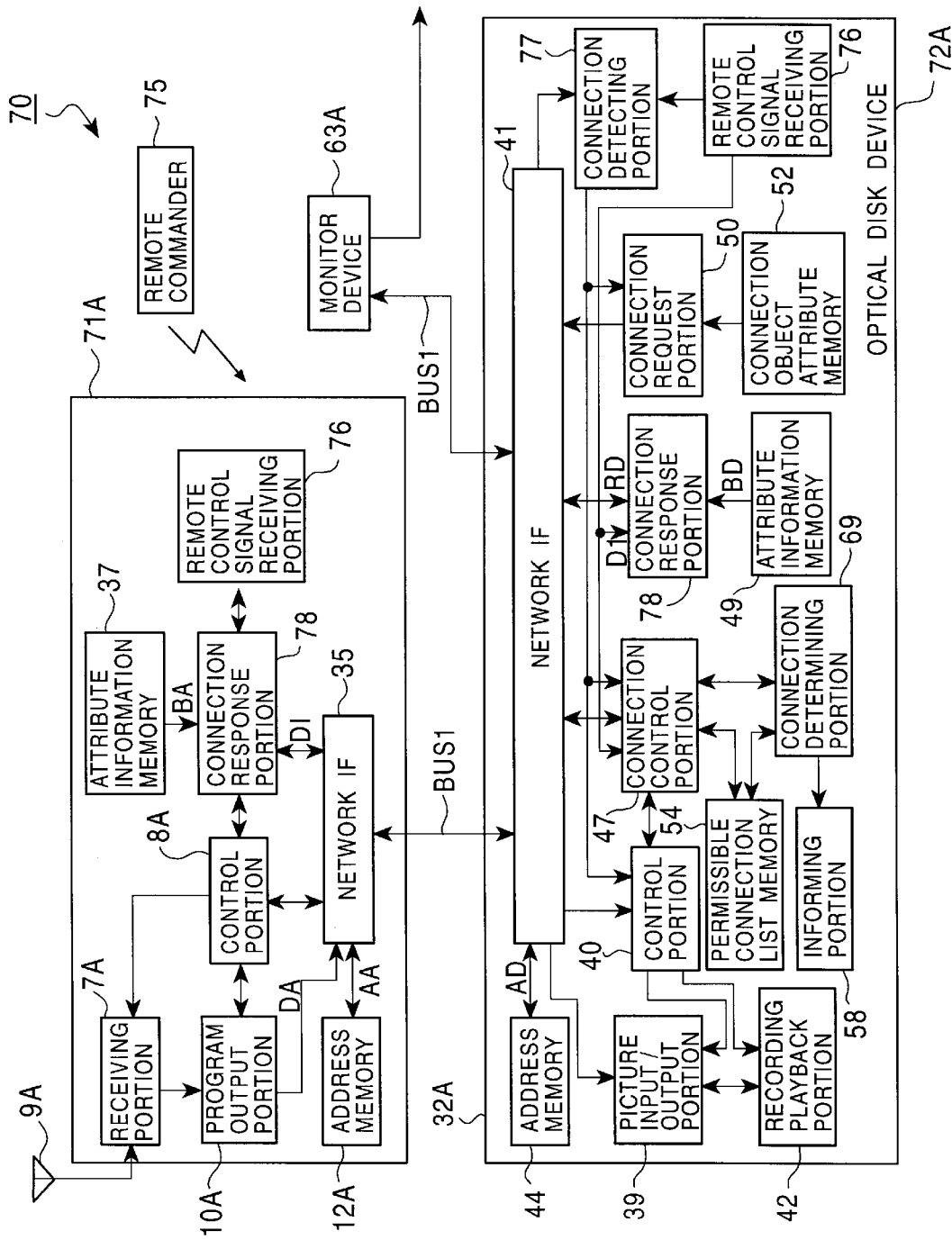
FIG. 12 is a block diagram showing the detailed configuration of a tuner and an optical disk device in an AV system according to a fourth embodiment of the present invention.
Figure 13:
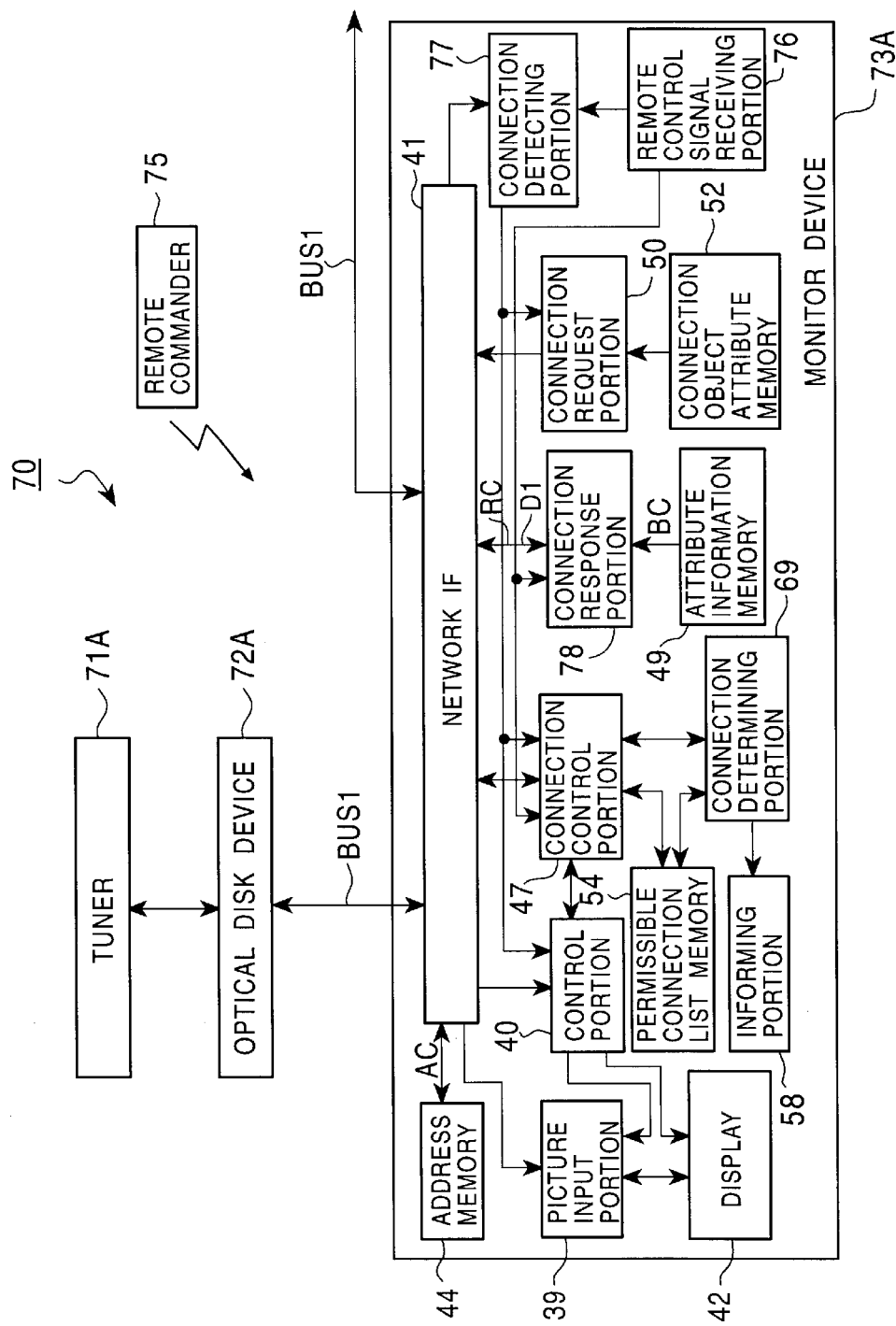
FIG. 13 is a block diagram showing the detailed configuration of a monitor device in the AV system of FIG. 12.

FIGS. 12 and 13 are block diagrams showing an AV system according to a fourth embodiment of the present invention, the diagrams corresponding respectively to FIGS. 6 and 7 for comparison. In an AV system 70 of this embodiment, the order of precedence in connections is set by using a remote commander 75.

More specifically, a tuner 71A, an optical disk device 72A and a monitor device 73A each include a remote control signal receiving portion 76. A connection detecting portion 77 in each of the latter two devices 72A, 73A issues a notice prompting to prepare a permissible connection list also in the case of the remote commander 75 being manipulated, in addition to the cases where the conditions to start the setting of the connection relationship are met as stated above in connection with the second embodiment.

Furthermore, in the tuner 71A as subsidiary equipment and the hosts 72A, 73A, when the manipulation of the remote commander 75 is detected through the remote control signal receiving portion 76, a connection response portion 78 outputs the attribute information and equipment address of its own equipment after adding thereto identification data D1, in response to an inquiry as to whether the equipment is connectable or not.

With the system configuration shown in FIGS. 12 and 13, therefore, the order of precedence in connections can be registered such that those pieces of equipment arranged in a range where a remote control signal from the remote commander 75 can be received at the same time are connected with priority. As a result, the order of precedence in connections registered as explained above in connection with the second embodiment can be set again or modified based on a remote control signal from the remote commander 75; hence the AV system can be made even more convenient for the user than the AV system of the second embodiment.

(5) Other Embodiments

While the above second to fourth embodiments have been described in connection with the case where the equipment receiving a connection request issues a response after determining whether the equipment is connectable or not, the present invention is not limited to that case, but may be modified such that the equipment having delivered the connection request may determine, based on responses from the individual pieces of equipment, whether they are connectable or not.

Also, the above second to fourth embodiments have been described as issuing an inquiry to other pieces of equipment about whether they are connectable or not, when any of the conditions, such as turning-on of the main power supply, is met. However, the present invention is not limited to those embodiments, but may be constituted to issue the inquiry about connection of the equipment depending on other various conditions than stated above, as required. For example, the inquiry may be issued each time any equipment is to be connected for communication. In such a case, there is no longer a need of holding the permissible connection list, and the configuration of the entire system can be simplified correspondingly.

While the above embodiments have been described as responding to the inquiry by determining just whether the equipment is connectable or not, the present invention is not limited to those embodiments, but may be constituted to add in the response a result of further determination whether the equipment is under operation or not. This makes it possible to omit the equipment, which is already started up and under operation, from the objects to be connected.

While the above embodiments have been described in connection with an AV system made up of a tuner, an optical disk device and a monitor device, the present invention is not limited to such an AV system, but may be widely applied to various AV systems made up of a variety of video equipment including, e.g., a video tape recorder.

Further, in the above embodiments, the present invention is applied to an AV system and individual pieces of equipment are connected to a bus in conformity with IEEE 1394. However, the present invention is not limited to such an AV system, but may be widely applied to other systems, e.g., an audio system which is made up of a variety of audio equipment interconnected through serial interfaces and parallel interfaces, as well as various communication network systems.

According to the present invention, as described above, information indicating an attribute of each equipment and an address of the equipment are transmitted and received via a bus between a variety of equipment, and whether one piece of equipment is connectable or not another is determined based on the received attribute information. Therefore, various information signals can be transmitted and received between corresponding two of the variety of equipment just by connecting the equipment by cables to form a network. As a result, the work of installing the equipment can be simplified.

In addition, by setting the order of precedence in connections based on the attribute information etc., it is possible to connect, e.g., those pieces of equipment which are arranged in the same room, with priority. As a result, the network can be made more convenient for the user.

What is claimed is:

1. An information signal transmitting apparatus for transmitting and receiving a desired information signal via a network, comprising:

identification information delivering means for delivering, to other pieces of equipment on said network, attribute information indicating an attribute of said apparatus and an equipment address indicating an address of said apparatus on said network;

identification information acquiring means for acquiring, from said other pieces of equipment, attribute information of said other pieces of equipment and equipment addresses of said other pieces of equipment; and determining means for comparing information signal format information included in the attribute information of said other pieces of equipment acquired by said identification information acquiring means with information signal format information included in the attribute information delivered from said identification information delivering means and indicating the attribute of said apparatus, and determining whether said information signal can be communicated between said other pieces of equipment and said apparatus.

2. An information signal transmitting apparatus according to claim 1, wherein said identification information acquiring means acquires the attribute information and the equipment addresses by requesting said other pieces of equipment to deliver the attribute information and the equipment addresses.

3. An information signal transmitting apparatus according to claim 1, wherein said determining means includes connection-precedence-order setting means for setting the order of precedence in connections between said other pieces of equipment based on the acquired equipment addresses, and wherein said apparatus transmits or receives said information signal in accordance with the set order of precedence in connections.

4. An information signal transmitting apparatus according to claim 1, further comprising connection-precedence-order setting means for setting the order of precedence in connections between said other pieces of equipment in response to manipulation of a control button, wherein said apparatus transmits or receives said information signal in accordance with the set order of precedence in connections.

5. An information signal transmitting apparatus according to claim 1, further comprising connection-precedence-order setting means for setting the order of precedence in connections between said other pieces of equipment based on those pieces of equipment which can be controlled by one remote control means, wherein said apparatus transmits or receives said information signal in accordance with the set order of precedence in connections.

6. An information signal transmitting apparatus according to claim 1, wherein said attribute information includes information about the type of equipment.

7. An information signal transmitting apparatus according to claim 1, wherein said identification information acquiring means generates a predetermined alarm when said identification information acquiring means requests said other pieces of equipment to deliver the attribute information and the equipment addresses, but cannot acquire the attribute information and the equipment address from any of said other pieces of equipment.

8. An information signal transmitting apparatus according to claim 1, further comprising informing means for generating a predetermined alarm when said determining means determines that said information signal cannot be communicated between the equipment and said apparatus.

9. An information signal transmitting-apparatus according to claim 1, wherein, in response to a request from any one of said other pieces of equipment, said identification information delivering means determines whether said information signal can be communicated between the one of said other pieces of equipment and said apparatus, and delivers the equipment address and the attribute information based on the determined result.

10. An information signal transmitting apparatus according to claim 1, wherein said identification information delivering means delivers the equipment address and the attribute information in response to a request from any of said other pieces of equipment.

11. An information signal transmitting apparatus according to claim 10, wherein said identification information acquiring means requests said other pieces of equipment to deliver the attribute information and the equipment addresses upon detecting that said other pieces of equipment are arranged in said network.

12. An information signal transmitting apparatus according to claim 10, wherein said identification information acquiring means requests said other pieces of equipment to deliver the attribute information and the equipment addresses when said apparatus is arranged in said network.

13. An information signal transmitting method for use with an apparatus for transmitting and receiving a desired information signal via a network, comprising:

an identification information delivering step for delivering, to other pieces of equipment on said network, attribute information indicating an attribute of said apparatus and an equipment address indicating an address of said apparatus on said network, an identification information acquiring step for acquiring, from said other pieces of equipment, attribute information of said other pieces of equipment and equipment addresses of said other pieces of equipment, and a determining step for comparing information signal format information included in the attribute information of said other pieces of equipment acquired by said identification information acquiring step with information signal format information included in the attribute information delivered in said identification information delivering step and indicating the attribute of said apparatus, and determining whether said information signal can be communicated between said other pieces of equipment and said apparatus.

14. A medium storing an information signal transmitting program executable by an apparatus for transmitting and receiving a desired information signal via a network, said program comprising:

an identification information delivering step for delivering, to other pieces of equipment on said network, attribute information indicating an attribute of said apparatus and an equipment address indicating an address of said apparatus on said network, an identification information acquiring step for acquiring, from said other pieces of equipment, attribute information of said other pieces of equipment and equipment addresses of said other pieces of equipment, and a determining step for comparing information signal format information included in the attribute information of said other pieces of equipment acquired by said identification information acquiring step with information signal format information included in the attribute information delivered in said identification information delivering step and indicating the attribute of said apparatus, and determining whether said information signal can be communicated between said other pieces of equipment and said apparatus.

\* \* \* \* \*